(12) United States Patent
Newman

(10) Patent No.: US 11,379,949 B1
(45) Date of Patent: Jul. 5, 2022

(54) SYSTEMS AND METHODS FOR SIMULATING MULTIPLE LENS DISTORTIONS WITHIN A SINGLE IMAGE

(71) Applicant: GoPro, Inc., San Mateo, CA (US)

(72) Inventor: David Newman, San Diego, CA (US)

(73) Assignee: GoPro, Inc., San Mateo, CA (US)

( * ) Notice: Subject to any disclaimer, the term of this patent is extended or adjusted under 35 U.S.C. 154(b) by 116 days.

(21) Appl. No.: 17/001,409

(22) Filed: Aug. 24, 2020

Related U.S. Application Data

(60) Provisional application No. 62/891,719, filed on Aug. 26, 2019.

(51) Int. Cl.
  *G06T 3/00* (2006.01)
(52) U.S. Cl.
  CPC .................................. *G06T 3/0093* (2013.01)
(58) Field of Classification Search
  None
  See application file for complete search history.

(56) References Cited

U.S. PATENT DOCUMENTS

| | | | |
|---|---|---|---|
| 8,681,224 B2* | 3/2014 | Mallon | G01M 11/0264 348/335 |
| 9,142,012 B2* | 9/2015 | Lim | G06T 5/002 |
| 10,119,809 B2* | 11/2018 | Narayanswamy | G01B 11/245 |
| 10,991,067 B2* | 4/2021 | Appleboim | G06T 7/30 |
| 11,089,247 B2* | 8/2021 | Cote | H04N 5/365 |
| 11,164,282 B2* | 11/2021 | Newman | G06T 3/00 |
| 11,170,559 B2* | 11/2021 | Urbina Escos | G06T 15/06 |
| 2016/0241791 A1* | 8/2016 | Narayanswamy | G01B 11/245 |
| 2019/0005987 A1* | 1/2019 | Campbell | H04N 9/806 |
| 2021/0035261 A1* | 2/2021 | Newman | G06T 3/40 |
| 2022/0014697 A1* | 1/2022 | Cote | H04N 5/365 |

* cited by examiner

*Primary Examiner* — Anand P Bhatnagar
(74) *Attorney, Agent, or Firm* — Esplin & Associates, PC

(57) ABSTRACT

Multiple single lens distortion regions and one or more boundary regions may be determined within an image. Individual single lens distortion regions may have pixel displacement defined by a single lens distortion and individual boundary regions may have pixel displacement defined by a blend of at least two lens distortions. Multiple lens distortions may be simulated within the image by shifting pixels of the image input positions to output positions based on locations of pixels within a single lens distortion region and the corresponding single lens distortion or within a boundary region and a blend of corresponding lens distortions.

20 Claims, 12 Drawing Sheets

702

704

706

708

710

800

SYSTEMS AND METHODS FOR SIMULATING MULTIPLE LENS DISTORTIONS WITHIN A SINGLE IMAGE

FIELD

This disclosure relates to simulating multiple lens distortions within images.

BACKGROUND

Different types of projections may cause different pixel displacement within an image. Use of a single projection within an image may cause undesired pixel displacement within one or more portions of the image.

SUMMARY

) This disclosure relates to simulating multiple lens distortions within images. Image information, multi-lens distortion information, and/or other information may be obtained. The image information may define one or more images including visual content. The visual content of an image may be defined by pixels located at input positions and/or other information. The multi-lens distortion information may identify multiple lens distortions to be simulated within the image(s) and locations of the multiple lens distortions within the image(s). The multiple lens distortions may include a first lens distortion positioned at a first lens distortion location within the image(s), a second lens distortion positioned at a second lens distortion location within the image(s), and/or other lens distortions positions at other distortion locations within the image(s).

Multiple single lens distortion regions and one or more boundary regions within the image(s) may be determined based on the multi-lens distortion information and/or other information. Individual single lens distortion regions may have pixel displacement defined by a single lens distortion and/or other information. Individual boundary regions may have pixel displacement defined by a blend of at least two lens distortions and/or other information. The multiple single lens distortion regions may include a first lens distortion region having pixel displacement defined by the first lens distortion and a second lens distortion region having pixel displacement defined by the second lens distortion. The boundary region(s) may include a boundary region having pixel displacement defined by a blend of the first lens distortion and the second lens distortion. The boundary region may be located between the first lens distortion region and the second lens distortion region.

The pixels of the image(s) may be shifted from the input positions to output positions based on locations of the input positions of the pixels within one of the multiple single lens distortion region and a corresponding single lens distortion or within one of the boundary region(s) and a blend of at least two corresponding lens distortions.

A system that simulates multiple lens distortions within images may include one or more electronic storages, one or more processors, and/or other components. An electronic storage may store image information, information relating to images, multi-lens distortion information, information relating to lens distortions, information relating to single lens distortion regions, information relating to boundary regions, information relating to pixel displacement, information relating to a single lens distortion, information relating to a blend of lens distortions, and/or other information.

The processor(s) may be configured by machine-readable instructions. Executing the machine-readable instructions may cause the processor(s) to facilitate simulating multiple lens distortions within images. The machine-readable instructions may include one or more computer program components. The computer program components may include one or more of an image information component, a multi-lens distortion information component, a region component, a distort component, and/or other computer program components.

The image information component may be configured to obtain image information and/or other information. The image information may define one or more images. An image may include visual content. The visual content may be defined by pixels of the image located at input positions and/or other information.

The multi-lens distortion information component may be configured to obtain multi-lens distortion information and/or other information. The multi-lens distortion information may identify multiple lens distortions to be simulated within one or more images and locations of the multiple lens distortions within the image(s). The multiple lens distortions may include a first lens distortion positioned at a first lens distortion location within the image(s), a second lens distortion positioned at a second lens distortion location within the image(s), and/or other lens distortions positions at other distortion locations within the image(s).

In some implementations, the locations of the multiple lens distortions within the image(s) may be defined by values of a pan parameter, a tilt parameter, a rotate parameter, a size parameter, and/or other parameters. In some implementations, the first lens distortion and the second lens distortion may be adjacently positioned within the image(s) such that the first lens distortion location is next to the second lens distortion location. In some implementations, the first lens distortion may be positioned within the second lens distortion such that the first lens distortion location is within the second lens distortion location.

In some implementations, the locations of the multiple lens distortions within the image(s) may be determined based on visual content detection and/or other information. For example, the first lens distortion may use a rectilinear projection, the second lens distortion may use a stereographic projection, and the visual content detection may include horizon detection. The locations of the multiple lens distortions within the image(s) may be determined based on the horizon detection such that the first lens distortion location is above or includes a horizon detected within the image(s) and the second lens distortion location is below the horizon detected within the image(s).

In some implementations, the first lens distortion and/or the second lens distortion may use multiple lens projections. For example, the multiple lens projections used by the first lens distortion and/or the second lens distortion include both rectilinear projection and stereographic projection, and/or other combinations of projections.

The region component may be configured to determine multiple single lens distortion regions and one or more boundary regions within the image based on the multi-lens distortion information and/or other information. Individual single lens distortion regions may have pixel displacement defined by a single lens distortion and/or other information, and individual boundary regions may have pixel displacement defined by a blend of at least two lens distortions and/or other information such that (1) the multiple single lens distortion regions include a first lens distortion region having pixel displacement defined by the first lens distortion and a second lens distortion region having pixel displacement defined by the second lens distortion, and (2) the boundary region(s) includes a first boundary region having pixel displacement defined by a blend of the first lens distortion and the second lens distortion, with the first boundary region being located between the first lens distortion region and the second lens distortion region.

In some implementations, a blend of multiple lens distortions may be determined based on an alpha transition between lens geometric properties of the multiple lens distortions and/or other information. For example, the blend of the first lens distortion and the second lens distortion for the first boundary region may be determined based on an alpha transition between first lens geometric properties of the first lens distortion and second lens geometric properties of the second lens distortion, and/or other information. An alpha value of the alpha transition for a pixel may be determined based on a corresponding input position within the first boundary region.

The distort component may be configured to shift the pixels of the image(s) from the input positions to output positions based on locations of the input positions of the pixels within (1) one of the multiple single lens distortion region and a corresponding single lens distortion, (2) one of the one or more boundary regions and a blend of at least two corresponding lens distortions, and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
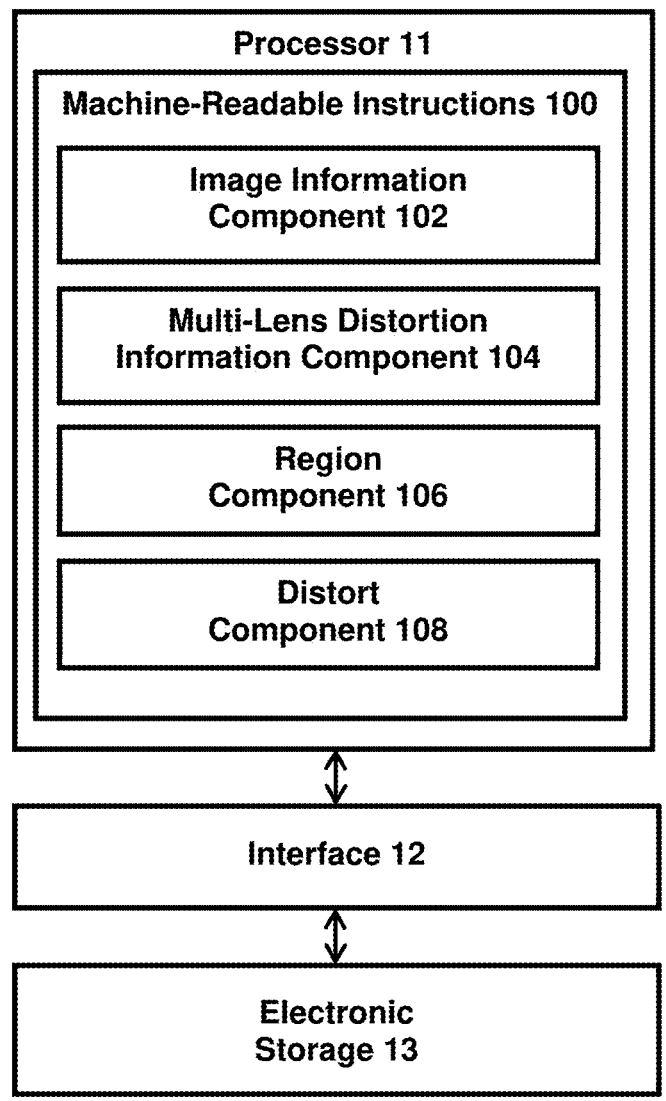
FIG. 1 illustrates an example system that simulates multiple lens distortions within images.

FIG. 1 illustrates a system 10 for simulating multiple lens distortions within images. The system 10 may include one or more of a processor 11, an interface 12 (e.g., bus, wireless interface), an electronic storage 13, and/or other components. Image information, multi-lens distortion information, and/or other information may be obtained by the processor 11. The image information may define one or more images including visual content. The visual content of an image may be defined by pixels located at input positions and/or other information. The multi-lens distortion information may identify multiple lens distortions to be simulated within the image(s) and locations of the multiple lens distortions within the image(s). The multiple lens distortions may include a first lens distortion positioned at a first lens distortion location within the image(s), a second lens distortion positioned at a second lens distortion location within the image(s), and/or other lens distortions positions at other distortion locations within the image(s).

Multiple single lens distortion regions and one or more boundary regions within the image(s) may be determined by the processor 11 based on the multi-lens distortion information and/or other information. Individual single lens distortion regions may have pixel displacement defined by a single lens distortion and/or other information. Individual boundary regions may have pixel displacement defined by a blend of at least two lens distortions and/or other information. The multiple single lens distortion regions may include a first lens distortion region having pixel displacement defined by the first lens distortion and a second lens distortion region having pixel displacement defined by the second lens distortion. The boundary region(s) may include a boundary region having pixel displacement defined by a blend of the first lens distortion and the second lens distortion. The boundary region may be located between the first lens distortion region and the second lens distortion region.

The pixels of the image(s) may be shifted by the processor 11 from the input positions to output positions based on locations of the input positions of the pixels within one of the multiple single lens distortion region and a corresponding single lens distortion or within one of the boundary region(s) and a blend of at least two corresponding lens distortions.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store image information, information relating to images, multi-lens distortion information, information relating to lens distortions, information relating to single lens distortion regions, information relating to boundary regions, information relating to pixel displacement, information relating to a single lens distortion, information relating to a blend of lens distortions, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate simulating multiple lens distortions within images. The machine-readable instructions 100 may include one or more computer program components. The machine-readable instructions 100 may include one or more of an image information component 102, a multi-lens distortion information component 104, a region component 106, a distort component 108, and/or other computer program components.

The image information component 102 may be configured to obtain image information and/or other information. Obtaining image information may include one or more of accessing, acquiring, analyzing, determining, examining, identifying, loading, locating, opening, receiving, retrieving, reviewing, storing, and/or otherwise obtaining the image information. The image information component 102 may obtain image information from one or more locations. For example, the image information component 102 may obtain image information from a storage location, such as the electronic storage 13, electronic storage of a device accessible via a network, and/or other locations. The image information component 102 may obtain image information from one or more hardware components (e.g., an image sensor, electronic storage) and/or one or more software components (e.g., software running on a computing device). Image information may be stored within a single file or multiple files.

In some implementations, the image information component 102 may obtain image information based on user interaction with a user interface/application (e.g., image/video editing application, image/video player application), and/or other information. For example, a user interface/application may provide option(s) for a user to select one or more images in which multiple lens distortions are to be simulated. The image information defining the image(s) may be obtained based on the user's selection of the image(s) through the user interface/application. Other selections of images are contemplated.

The image information may define one or more images. The image information may define an image by including information that defines one or more content, qualities, attributes, features, and/or other aspects of the image. For example, the image information may define an image by including information that makes up the content of the image and/or information that is used to determine the content of the image. For instance, the image information may include information that makes up and/or is used to determine the arrangement of pixels, characteristics of pixels, values of pixels, and/or other aspects of pixels that define visual content of the image. For example, the image information may include information that makes up and/or is used to determine pixels of the image. Other types of image information are contemplated.

An image may include content captured by a single image capture device (e.g., image sensor, camera), multiple image capture devices, and/or one or more other capture devices (e.g., sound sensor, microphone). An image including content captured by multiple capture devices may include content captured at the same location(s), content captured at different locations, content captured at the same time(s), and/or content captured at different times. An image may include edited content. For example, an image may include content of one or more other images that have been edited into an edited image.

An image may include visual content. Visual content may refer to content of one or more images that may be consumed visually. For example, visual content may be included within one or more images and/or one or more video frames of a video. An image may include a standalone image, an image within a sequence of images, and/or a video frame of a video at one or more moments within a progress length of the video. A video frame may include one or more of I-frame, P-frame, B-frame, frame of pixels, and/or other video frames. Visual content may be generated based on light received within a field of view of a single image sensor or within fields of view of multiple image sensors during a capture period.

The visual content of an image may be defined by pixels of the image located at input positions and/or other information. An input position of a pixel may define the location of the pixel within the image. For example, an input position of a pixel within an image may define lateral and vertical locations (e.g., x-y location) of the pixel within the image. For a spherical image, an input position of a pixel may define locations of the pixel based on rotation about one or more axes (e.g., yaw axis, pitch axis, roll axis) of the sphere.

The pixels may have one or more visual characteristics. Visual characteristics of a pixel may refer to one or more of feature, quality, quantity, trait, property, value, measurable factor, and/or other information that characterizes one or more visual aspects of the pixel. For example, visual characteristics of a pixel may include color characteristics and/or other visual characteristics. Color characteristics may define one or more characteristics of color in RGB (red, green, blue) color space, HSL (hue, saturation, lightness) color space, HSV (hue, saturation, value) color space, and/or other color space. For example, color characteristics may include one or more of red color characteristic, green color characteristic, blue color characteristic, hue characteristic, saturation characteristic, lightness characteristic, value characteristic, and/or other color characteristics.

In some implementations, an image may include a wide-angle image. A wide-angle image may refer to an image captured through use of one or more wide-angle optical elements, such as one or more wide-angle lens. In some implementations, a wide-angle lens may include a viewing angle of more than about 60 degrees.

A wide-angle image may include a spherical image. A spherical image may include visual content viewable from one or more points of view (e.g., within a sphere, center of a sphere). Spherical visual content may be generated through capture of multiple views from a single location. Spherical visual content may be captured through the use of one or more image capture devices (e.g., image sensors, cameras) to capture images from a location. The captured images may be stitched together to form the spherical image. Visual content of a spherical image may include full spherical visual content (360 degrees of capture) or partial spherical visual content (less than 360 degrees of capture). Partial spherical visual content may be referred to as panoramic visual content.

Different projections of the visual content may result in different arrangement of pixels that define the visual content. How pixels of the image are arranged to form the visual content may depend on projection of the visual content. Projection of visual content may refer to how portions of the visual content/pixels are mapped onto a two-dimensional plane (e.g., two-dimensional image). For example, a projection may arrange pixels of the image such that one or more visual elements (defined by one or more pixels) of the visual content are stretched (e.g., at the top or bottom of an image arranged using an equirectangular projection). Example projections may include rectilinear projection, cylindrical projection, Mercator projection, Miller projection, Lambert projection, equirectangular projection, stereographic projection, fisheye projection, equisolid projection, orthographic projection, cubic projection, sinusoidal projection, transverse projection (rotation of a projection by 90 degrees), Panini projection, architectural projection, and/or other projections.

Projections may include non-distortion projections, distortion projections, and/or other projections. A non-distortion projection may refer to a projection that arranges pixels of the image such that depictions of things within the visual content is not visually distorted (e.g., stretched, warped, compressed). For example, a non-distortion projection may arrange visual elements of visual content such that a depiction of a straight line appears straight. A distortion projection may refer to a projection that arranges pixels of the image such that one or more depictions of things within the visual content are visually distorted (e.g., stretched, warped, compressed). A distortion projection may distort the depictions of things linearly or non-linearly (e.g., as a function of input positions of the pixels). A distortion projection may distort the depictions of things uniformly or non-uniformly.

Projection of visual content may be used for visual content presentation, visual content storage, and/or other use of the visual content. For example, different projections of the visual content may be used to present different views (e.g., non-distorted view, distorted view) of the visual content. Different projections of the visual content may be used to store the visual content with different views. For example, rectilinear projection may be used to arrange pixels of the image such that a depiction of a straight line appears straight within the visual content while equirectangular projection may be used to arrange pixels of the image such that only vertical lines and center horizontal lines appear straight while other lines appear curved within presentation of the visual content.

Figure 3A:
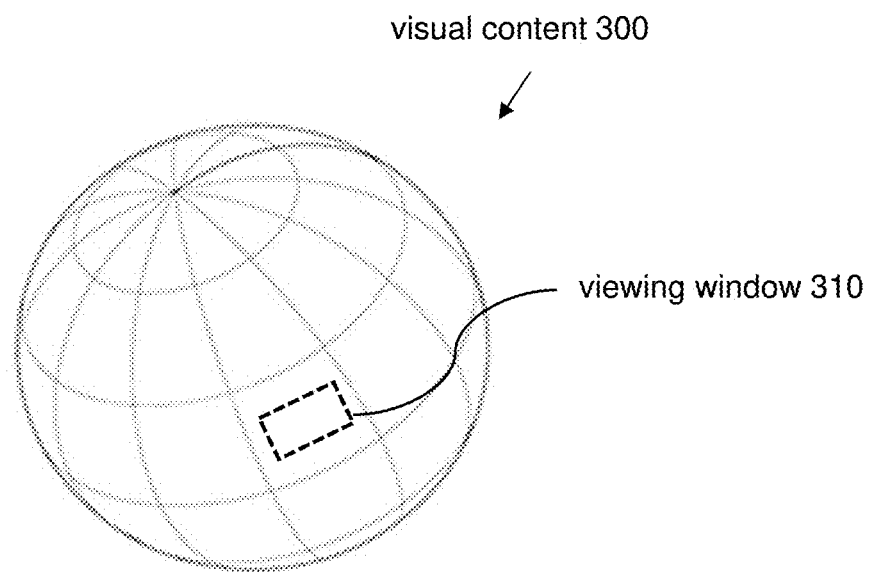
FIG. 3A illustrates example visual content.

FIG. 3A illustrates example visual content 300 of a spherical image. As shown in FIG. 3A, the spherical image may include the visual content 300 viewable from one or more points of view, such as the center of the sphere. One or more portions or entirely of the visual content 300 may be viewed at a time. For example, a viewing window 310 may define one or more extents of the visual content 300 and the extent(s) of the visual content 300 within the viewing window may be presented (e.g., punched out). Use of non-distortion projection (e.g., rectilinear projection) may provide non-distorted view of the extent(s) of visual content 300 within the viewing window/punchout.

Figure 3B:
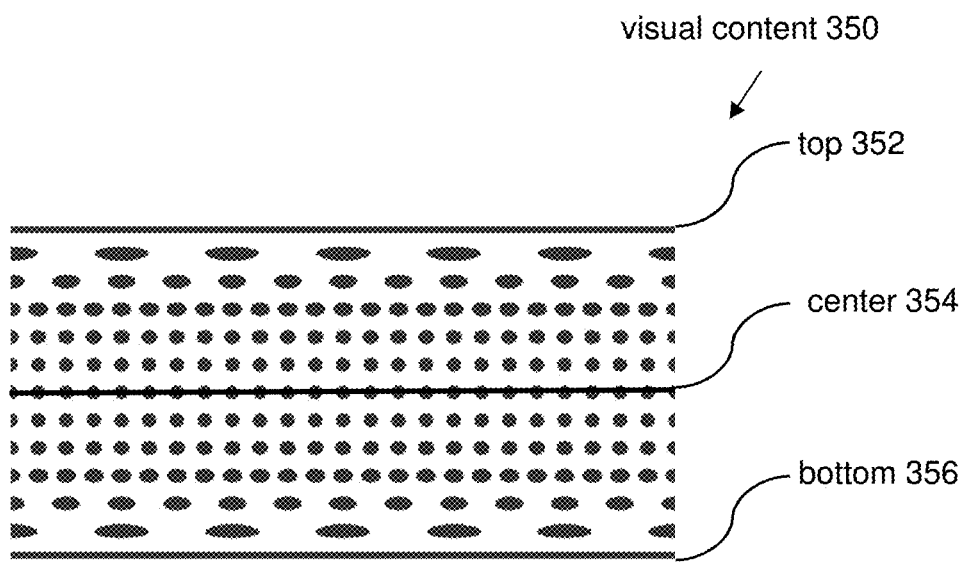
FIG. 3B illustrates example visual content projected using equirectangular projection.

FIG. 3B illustrates example visual content 350 (e.g., spherical visual content) projected using equirectangular projection. The use of the equirectangular projection may cause different displacement of pixels defining the visual elements as a function of the input positions of the pixels to cause different distortions of the visual elements. The visual content 350 may include a center portion in which visual elements are not distorted based on use of the equirectangular projection. For example, the visual elements of the visual content 350 along the center 354 may not be stretched, warped, compressed, and/or otherwise distorted based on use of the equirectangular projection. Visual elements in other parts of the visual content 350 may be distorted based on use of the equirectangular projection. For example, as shown in FIG. 3B, visual elements further away from the center 354 may be more stretched than other visual elements based on use of the equirectangular projection. Visual elements located at the top 352 and the bottom 356 may be stretched most.

Use of a single projection within an image may not be desirable. For example, use of a single projection to arrange pixels of the image for presentation may result in undesired pixel displacement within one or more portions of the image. For instance, a projection may be used for pixels of a spherical image to simulate the image/portion of the image within a viewing window having been captured by a virtual lens with virtual lens distortions (e.g., fisheye lens, rectilinear lens, stereographic lens). The virtual lens distortions (caused by geometric properties of the virtual lens) may result in undesired distortion in one or more parts of the image. A single projection/signal lens distortion may be inadequate to present a desired view of the image. For example, in a spherical image, it may be desirable for different portions of the image to be presented using different projections/lens distortions so that different portions of the image are presented with different curvature. For instance, it may be desirable for near objects captured in the spherical image to be presented using a wider field of view with greater curvature than distant objects captured in the spherical image.

The multi-lens distortion information component 104 may be configured to obtain multi-lens distortion information and/or other information. Obtaining multi-lens distortion information may include one or more of accessing, acquiring, analyzing, determining, examining, identifying, loading, locating, opening, receiving, retrieving, reviewing, storing, and/or otherwise obtaining the multi-lens distortion information. The multi-lens distortion information component 104 may obtain multi-lens distortion information from one or more locations. For example, the multi-lens distortion information component 104 may obtain multi-lens distortion information from a storage location, such as the electronic storage 13, electronic storage of a device accessible via a network, and/or other locations. The multi-lens distortion information component 10r may obtain multi-lens distortion information from one or more hardware components (e.g., computing device, electronic storage) and/or one or more software components (e.g., software running on a computing device). Multi-lens distortion information may be stored within a single file or multiple files.

In some implementations, the multi-lens distortion information component 104 may obtain multi-lens distortion information based on user interaction with a user interface/application (e.g., image/video editing application, image/video player application), and/or other information. For example, a user interface/application may provide option(s) for a user to select one or more of the multiple lens distortions to be simulated within an image, location of one or more of the multiple lens distortions to be simulated within the image, the number of lens distortions to be simulated within the image, and/or other aspects of the multiple lens distortions to be simulated within the image. Other selections of the multi-lens distortion information are contemplated.

In some implementation, the multi-lens distortion information component 104 may obtain multi-lens distortion information based on the image information and/or the image information component 102 obtaining the image information. For example, the multi-lens distortion information may be associated with the image/image information obtained by the image information component 102, and the multi-lens distortion information component 104 may obtain the associated multi-lens distortion information based on obtaining of the image information. The multi-lens distortion information may be included within metadata of the obtained image, and the multi-lens distortion information may be obtained based on obtaining (e.g., selection, retrieval) of the image. The multi-lens distortion information may be included within the image information, and the multi-lens distortion information component 104 may obtain multi-lens distortion information by extracting the multi-lens distortion information from the image information.

In some implementations, the multi-lens distortion information component 104 may obtain multi-lens distortion information based on analysis of the image information and/or the image(s) defined by the image information. For example, visual content detection (e.g., object detection, scene detection, activity detection) may be performed and the number, the type, and/or the locations of the multiple lens distortions to be simulated within the image may be determined based on the results of the visual content detection (e.g., object, scene, and/or activity detected within the visual content). For instance, based on the image including depiction of a person below a horizon, a stereographic lens distortion may be determined for the portion of the image including the depiction of the person and a rectilinear lens distortion may be determine for the portion of the image above and/or including the horizon.

The multi-lens distortion information may identify multiple lens distortions to be simulated within one or more images and locations of the multiple lens distortions within the image(s). Multiple lens distortions to be simulated within an image may include two or more lens distortions. For example, the multiple lens distortions may include a first lens distortion positioned at a first lens distortion location within an image, a second lens distortion positioned at a second lens distortion location within the image, and/or other lens distortions positions at other distortion locations within the image. The multi-lens distortion information may identify separate lens distortions to be simulated within different portions of an image. The multiple lens distortions identified by the multi-lens distortion information may define different distortions of pixels within an image. A distortion of pixels within an image may refer to changing of the pixels based on one or more characteristics of the pixels, such as based on input pixel locations and/or one or more visual characteristics of the pixels.

For example, the multiple lens distortions identified by the multi-lens distortion information may be use different projections, curvatures, and/or mathematical models to define different pixel displacements (e.g., pixel movement, pixel warping, pixel stretching, pixel compression, pixel changes) within different portions of the image(s) and simulate different lens distortions within different portions of the image(s). The multiple lens distortions identified by the multi-lens distortion information may use different visual characteristic transformations to define different changes in the visual characteristics of the pixels in different portions of the image(s) and simulate different lens distortions within different portions of the image(s). Other distortions of pixels by the lens distortions are contemplated.

The multi-lens distortion information may identify the multiple lens distortions to be simulated within the image(s) by identifying (e.g., establishing, indicating, defining, specifying) the types of the multiple lens distortions, the different projections used by the multiple lens distortions, curvatures of the multiple lens distortions, mathematical models that define pixel displacements of the multiple lens distortions, geometric properties of the multiple lens distortions, and/or visual characteristic transformations of the multiple lens distortions. Other identifications of the multiple lens distortions by the multi-lens distortion information are contemplated.

A projection, curvature, mathematical model, and/or visual characteristic transformation of a lens distortion may be defined by one or more lens geometric properties of the lens distortion. A lens geometric property of a lens distortion may refer to properties of a lens that affects arrangement of pixels to define images seen through the lens. For example, a lens geometric property may include one or more of lens shape, lens material, lens polynomials (e.g., polynomial lens distortion model), lens field of view, and/or other properties of the lens/lens distortion.

In some implementations, one or more of the multiple lens distortions may use multiple lens projections. For example, the first lens distortion and/or the second lens distortion may individually use multiple lens projections for different areas of the image, rather than using a single lens projection. The multiple lens projections used by the first lens distortion and/or the second lens distortion include both rectilinear projection and stereographic projection, and/or other combinations of different projections.

In some implementations, the projections used by a lens distortion may be defined by values of a lens projection parameter, and/or other parameters. A lens projection parameter may define which of the multiple lens projections are used at a particular location within the lens distortion. For example, a projection parameter may define, for a location within the lens distortion, which lens polynomials will be used to determine pixel displacement (e.g., pixel movement, pixel warping, pixel stretching, pixel compression, pixel changes) and simulate a virtual lens that includes characteristics of multiple types of lens.

The locations of the multiple lens distortions within the image(s) may define positioning of the multiple lens distortions within the image(s). The multi-lens distortion information may identify the locations of the multiple lens distortions by identifying center locations (where individual lens distortions are centered/directed at in the image(s) and how far and/or in what directions the multiple lens distortions extend from the center locations. The multi-lens distortion information may identify the locations of the multiple lens distortions by identifying boundaries of the multiple lens distortions. The multi-lens distortion information may identify the locations of the multiple lens distortions by identify strength/application of the multiple lens distortions are different portions within the image. Other identifications of the locations of the multiple lens distortions by the multi-lens distortion information are contemplated.

In some implementations, the locations of the multiple lens distortions within the image(s) may be defined by values of a pan parameter, a tilt parameter, a rotate parameter, a size parameter, and/or other parameters. A pan parameter may define lateral location of a lens distortion within the image. For example, a pan parameter may define the lateral location of a lens distortion (e.g., where center location of the lens distortion is laterally located) based on position on a lateral axis (e.g., x-axis) and/or based on rotation about a lateral location axis (e.g., yaw axis). A tilt parameter may define vertical location of a lens distortion within the image. For example, a tilt parameter may define the vertical location of a lens distortion (e.g., where center location of the lens distortion is vertically located) based on position on a vertical axis (e.g., y-axis) and/or based on rotation about a vertical location axis (e.g., pitch axis). A rotate parameter may define rotation of a lens distortion within the image. For example, a rotation parameter may define rotation of the lens distortion about the lateral and vertical locations of the lens distortion (e.g., x-y location) and/or based on rotation about a roll axis (e.g., how the lens distortion is rotated about the center location). A size parameter may define the size (field of view, shape, zoom) of a lens distortion within the image. For example, a size parameter may define how far from the center location of the lens distortion the lens distortion extends. The size parameter may define scaling of a regular or fixed shape (e.g., circle, square) of the lens distortion within the image or define an arbitrary shape of the lens distortion within the image. For instance, the size parameter may define a fixed shape of the lens distortion used within the image, a regular shape of the lens distortion selected by a user or determined based on visual content detection, and/or an arbitrary shape of the lens distortion selected by the user or determined based on visual content detection.

Locations of multiple lens distortions may define a particular arrangement of lens distortions within the image(s). Different combination of locations (relative locations) of multiple lens distortions may define different arrangements of lens distortions within the image(s). For example, the first lens distortion and the second lens distortion may be adjacently positioned (e.g., left and right, top and bottom, opposing corners) within the image(s) such that the first lens distortion location is next to the second lens distortion location. As another example, the first lens distortion may be positioned within the second lens distortion (e.g., concentric, non-concentric) such that the first lens distortion location is within the second lens distortion location. Other arrangements of lens distortions are contemplated.

In some implementations, the locations of the multiple lens distortions within the image(s) may be determined based on visual content detection and/or other information. For example, the first lens distortion may use a rectilinear projection (e.g., rectilinear lens distortion), the second lens distortion may use a stereographic projection (stereographic lens distortion), and the visual content detection may include horizon detection. The locations of the multiple lens distortions within the image(s) may be determined based on the horizon detection such that the first lens distortion location (for the rectilinear lens distortion) is above or includes a horizon detected within the image(s) and the second lens distortion location (for the stereographic lens distortion) is below the horizon detected within the image(s). Such locations of the multiple lens distortions may enable a wide view of the person depicted within the image via greater curvature with a less distorted view of the horizon/distant objects via less curvature.

The region component 106 may be configured to determine multiple single lens distortion regions and one or more boundary regions within the image based on the multi-lens distortion information and/or other information. Individual single lens distortion regions may have pixel distortion (e.g., pixel displacement, visual characteristic transformation) defined by a single lens distortion and/or other information. Individual boundary regions may have pixel distortion (e.g., pixel displacement, visual characteristic transformation) defined by a blend of multiple (at least two) lens distortions and/or other information. Individual boundary regions may have pixel distortion defined by a blend of multiple lens distortions surrounding/adjacent to the individual boundary regions. Pixel displacement may refer to change (e.g., movement, warping, stretching, compressing) of a pixel from an input position to an output position. An output position of a pixel may define the location of the pixel within the image after application of the corresponding lens distortion. Visual characteristic transformation may refer to change in visual characteristic(s) of one or more pixels, such as change in one or more color characteristics of pixel(s) from original value(s) value to different value(s) (e.g., transition of one color to another, transition of color value within a color range to another value within a different color range).

A single lens distortion region may refer to a region of the image in which pixel distortion (e.g., pixel displacement, visual characteristic transformation) is defined by a single lens distortion. For example, in a single lens distortion region, arrangement of pixels and/or changes in visual characteristics of the pixel may be determined based on a single lens distortion rather than multiple lens distortions. In a single lens distortion region, the pixels may be changed (e.g., moved, warped, stretched, compressed) from their input locations to their output locations based on a single lens distortion rather than multiple lens distortions. In a single lens distortion region, the visual characteristics of the pixels may be changed from their original values to other values based on a single lens distortion rather than multiple lens distortions.

A boundary region may be located between multiple single lens distortion regions. A boundary region may refer to a region of the image in which pixel distortion (e.g., pixel displacement, visual characteristic transformation) is defined by a blend of multiple lens distortions surrounding/adjacent to the boundary region. For example, in a boundary region, arrangement of pixels and/or changes in visual characteristics of the pixel may be determined based on multiple lens distortions rather than a single lens distortion. In a boundary region, the pixels may be changed from their input locations to their output locations based on multiple lens distortions rather than a single lens distortion. In a boundary region, the visual characteristics of the pixels may be changed from their original values to other values based on multiple lens distortions rather than a single lens distortion.

For example, the multiple single lens distortion regions may include a first lens distortion region having pixel displacement and/or visual characteristic transformation defined by the first lens distortion and a second lens distortion region having pixel displacement and/or visual characteristic transformation defined by the second lens distortion. The boundary region(s) may include a first boundary region located between the first lens distortion region and the second lens distortion region. The first boundary region may have pixel displacement and/or visual characteristic transformation defined by a blend of the first lens distortion and the second lens distortion.

Determination of multiple single lens distortion regions and one or more boundary regions within the image based on the multi-lens distortion information may include determination of where individual single lens distortion regions and individual boundary regions are positioned within the image based on the multi-lens distortion information. For example, the region component 106 may be configured to determine the center location of a single lens distortion region based on the center location of the corresponding lens distortion identified by the multi-lens distortions information, and may be configured to determine how far and/or in what directions the single lens distortion region extend from the center locations of the single lens distortion regions based on the multi-lens distortion information identifying how far and/or in what directions the corresponding lens distortion extend from its center location. The region component 106 may be configured to determine the boundary of a single lens distortion region based on the multi-lens distortion information identifying boundary of the corresponding lens distortion.

Figure 4A:
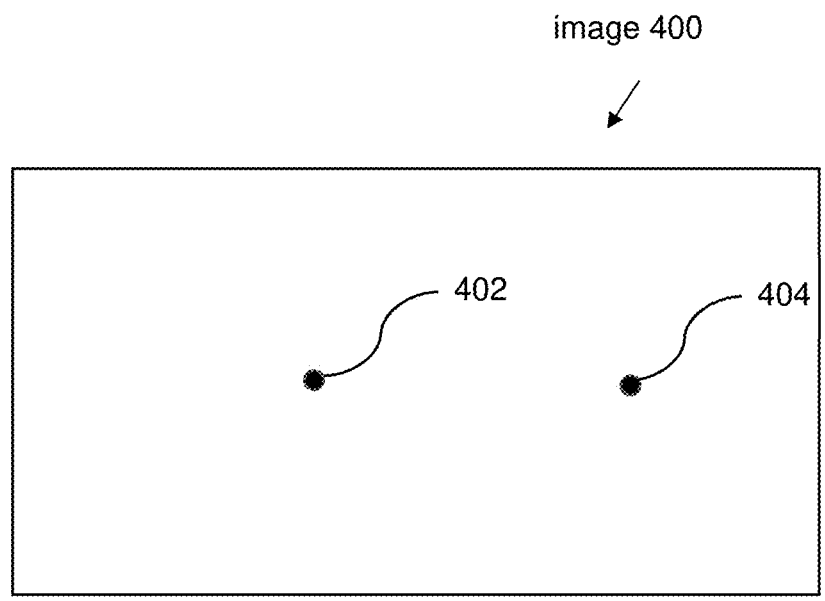
FIGS. 4A, 4B, 4C, and 4D illustrate example locations of multiple lens distortions within images.
Figure 4B:
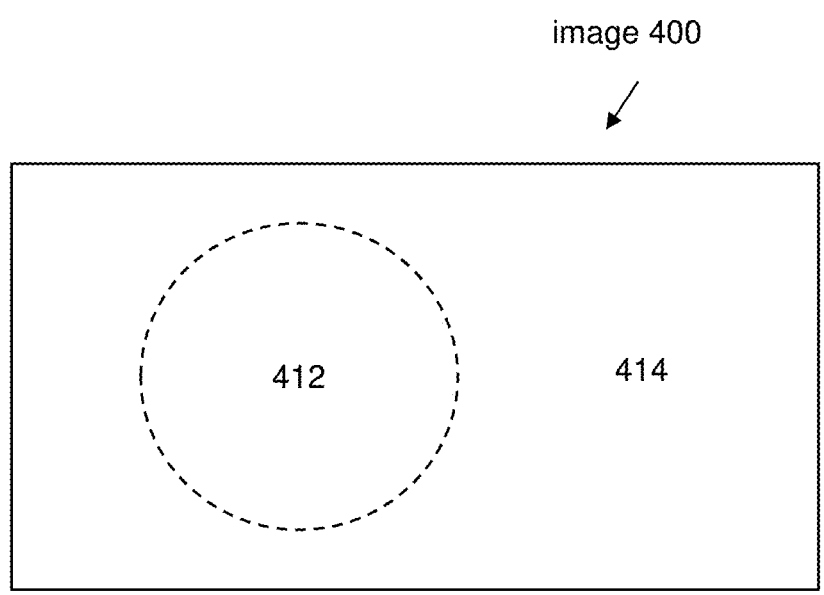
Figure 4C:
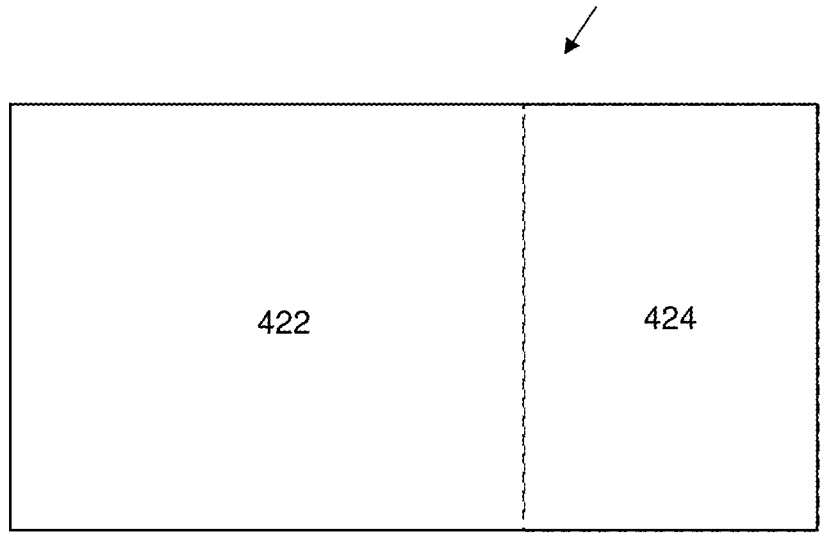
Figure 4D:
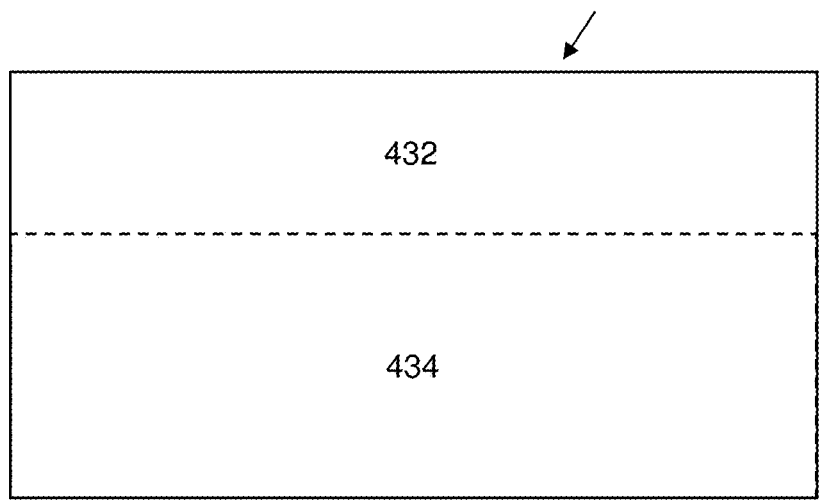

FIGS. 4A, 4B, 4C, and 4D illustrate example locations of multiple lens distortions within images. FIG. 4A shows example center locations 402, 404 of two single lens distortions within an image 400. FIGS. 4B and 4C illustrate different arrangements of single lens distortion regions based on the center locations 402, 404 of two single lens distortions within an image 400. In FIG. 4B, a single lens distortion region 412 (centered at the center location 402) may be positioned within a single lens distortion region 414 (centered at the center location 404) based on the lens distortion corresponding to the single lens distortion region 412 being positioned within the lens distortion corresponding to the single lens distortion region 414. In FIG. 4C, a single lens distortion region 422 (centered at the center location 402) and a single lens distortion region 424 (centered at the center location 404) may be adjacently positioned (left-right, laterally) within the image 400 based on the lens distortion corresponding to the single lens distortion region 422 and the lens distortion corresponding to the single lens distortion region 424 being adjacently positioned (left-right, laterally) within the image. FIG. 4D illustrates another example arrangement of single lens distortion regions where a single lens distortion region 432 and a single lens distortion region 434 are adjacently positioned (top-bottom, vertically) within an image 430. Other numbers and arrangements of single lens distortion regions are contemplated.

The region component 106 may be configured to determine locations of one or more boundary regions within an image based on arrangement of single lens distortion regions and/or other information. A boundary and/or an interface between multiple (two or more) single lens distortion regions may be determined to be a boundary region. For example, a region between two or more single lens distortion regions may be determined to be a boundary region. A region in which two or more single lens distortions region overlap may be determined to be a boundary region. Determination of a location of a boundary region may include determination of where the boundary region is located within the image, the shape of the boundary region within the image, and/or the size of the boundary region within the image. In some implementations, one or more user inputs may be used to determine/modify the location, shape, and/or size of a boundary region within the image.

Figure 5A:
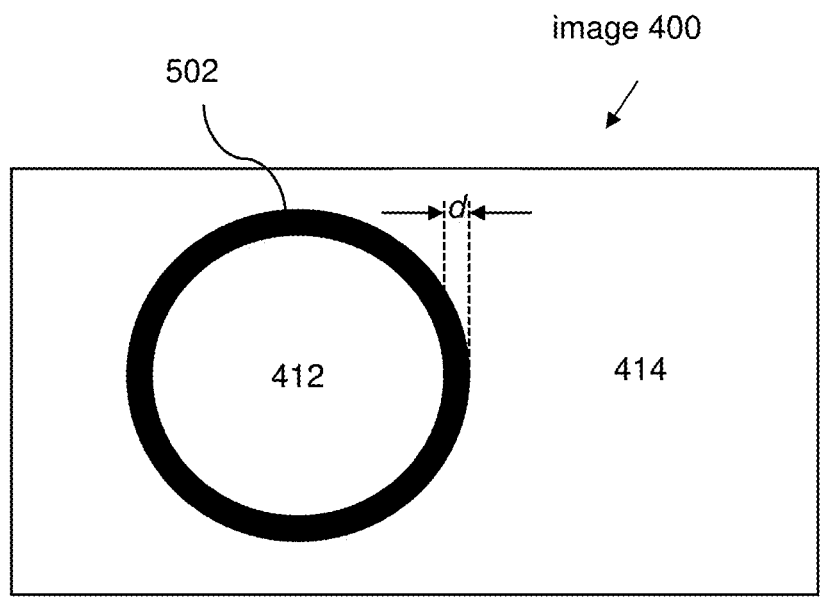
FIGS. 5A and 5B illustrate example single lens distortion regions and boundary regions within images.
Figure 5B:
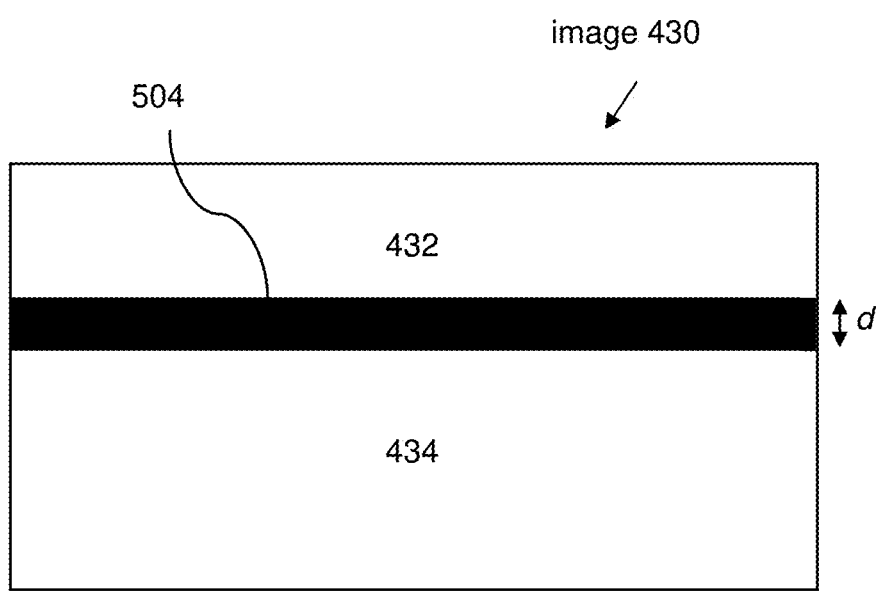

FIGS. 5A and 5B illustrate example single lens distortion regions and boundary regions within images. FIG. 5A illustrate an example boundary region 502 based on the arrangement of the signal lens distortions regions 412, 414 within the image 400 as shown in FIG. 4B. The boundary region 502 may be located between the single lens distortion regions 412, 414. The boundary region 502 may be determined at the boundary and/or the interface between the single lens distortion regions 412, 414. The boundary region 502 may be determined at the region of the image 400 where the single lens distortion regions 412, 414 overlap (begins to overlap). The boundary region 502 may have a circular shape and may have a thickness (size) of d.

FIG. 5B illustrate an example boundary region 504 based on the arrangement of the signal lens distortions regions 432, 434 within the image 430 as shown in FIG. 4D. The boundary region 504 may be located between the single lens distortion regions 432, 434. The boundary region 504 may be determined at the boundary and/or the interface between the single lens distortion regions 432, 434. The boundary region 504 may be determined at the region of the image 430 where the single lens distortion regions 432, 434 overlap. The boundary region 504 may have a rectangular shape and may have a height (size) of d. Other boundary regions are contemplated.

The distort component 108 may be configured to distort the pixels of the image(s) based on locations of the pixels within (1) one of the multiple single lens distortion region and a corresponding single lens distortion, (2) one of the one or more boundary regions and a blend of at least two corresponding lens distortions, and/or other information. For example, the distort component 108 may be configured to shift the pixels of the image(s) from their input positions to output positions based on locations of the input positions of the pixels within (1) one of the multiple single lens distortion region and a corresponding single lens distortion, (2) one of the one or more boundary regions and a blend of at least two corresponding lens distortions, and/or other information. The distort component 108 may be configured to change visual characteristics of the pixels from their original values to other values based on locations of the input positions of the pixels within (1) one of the multiple single lens distortion region and a corresponding single lens distortion, (2) one of the one or more boundary regions and a blend of at least two corresponding lens distortions, and/or other information. Other distortions of pixels based on locations of the pixels within a single lens distortion region or a boundary region are contemplated.

For pixels located within a single lens distortion region, the distort component 108 may distort the pixels based on the corresponding single lens distortion. For example, in FIG. 5A, pixels within the single lens distortion region 412 may be distorted (pixel positions/visual characteristics changed) based on the corresponding single lens distortion. Pixels within the single lens distortion region 414 may be distorted based on the corresponding single lens distortion. In FIG. 5B, pixels within the single lens distortion region 432 may be distorted (pixel positions/visual characteristics changed) based on the corresponding single lens distortion. Pixels within the single lens distortion region 434 may be distorted based on the corresponding single lens distortion.

For pixels located within a boundary region, the distort component 108 may distort the pixels based on the blend of multiple corresponding lens distortions. The multiple lens distortions corresponding to a boundary region may include multiple lens distortions surrounding/adjacent to the boundary region. For example, in FIG. 5A, pixels within the boundary region 502 may be distorted (pixel positions/visual characteristics changed) based on the blend of the lens distortion corresponding to the single lens distortion region 412 and the lens distortion corresponding to the single lens distortion region 414. The blend of the multiple correspond lens distortion may result in pixel distortions in the boundary region 502 morphing from pixel distortion corresponding to one of the lens distortions to another of the lens distortions. In FIG. 5B, pixels within the boundary region 504 may be distorted (pixel positions/visual characteristics changed) based on the blend of the lens distortion corresponding to the single lens distortion region 432 and the lens distortion corresponding to the single lens distortion region 434. The blend of the multiple correspond lens distortion may result in pixel distortions in the boundary region 504 morphing from pixel distortion corresponding to one of the lens distortions to another of the lens distortions.

Such use of the blend of lens distortion may facilitate continuous distortion of pixels within image(s) such that different lens distortions simulated within the image(s)

smoothly changes into other lens distortions. Without blending of the lens distortions, simulation of multiple lens distortions within the image may cause discontinuities in the visual content (e.g., break in continuity of visual elements/visual characteristics between different single lens distortions regions).

In some implementations, a blend of multiple lens distortions may be determined based on an alpha transition between lens geometric properties of the multiple lens distortions and/or other information. For example, the blend of two corresponding lens distortions (first lens distortion, second lens distortion) for a boundary region may be determined based on an alpha transition between lens geometric properties of the two corresponding lens distortions (first lens geometric properties of the first lens distortion, second lens geometric properties of the second lens distortion), and/or other information. An alpha transition between lens geometric properties of lens distortions may determine, for a pixel located within a boundary region, the impact and/or the weight of different projections, curvatures, mathematical models, visual characteristic transformations, lens shape, lens materials, lens polynomials, lens field of view, and/or other properties of the lens distortions on the distortion of the pixel. An alpha transition between lens geometric properties of lens distortions may enable mixing/blending of coefficients of the lens geometric properties, and facilitate blending/transition from one lens distortion to another lens distortion (e.g., from one mathematical model/lens polynomial to another mathematical model/lens polynomial) for distorting pixels, and facilitate, within the boundary region, continuous distortion of pixels from one single lens distortion region to another single lens distortion region.

An alpha transition may be determined based on an alpha value. For example, an alpha transition between values of two lens distortions, distortion and distortion B, may be determined as: AlphaValue*DistortionAValue+(1−AlphaValue)*(DistortionBValue). The alpha value of the alpha transition for a pixel may be determined based on a corresponding input position of the pixel located within the boundary region. For example, a pixel located within a boundary region, the alpha value may be determined based on the input position of the pixel within the boundary region, and the distortion of the pixel (e.g., output position of the pixel, zoom of the pixel, rotation of the pixel) may be determined as a blend of separate distortions of the pixel defined by separate lens distortions, with the impact and/or the weight of the separate distortions being determined by the alpha value. Other determinations of alpha transition are contemplated.

In some implementations, the alpha value may range between zero and one. Changes in the alpha value between zero and one may be determined based on the input position of the pixel located within the boundary region. For example, in FIG. 5A, the alpha value of the pixel located at the inner edge of the boundary region 502 (at the boundary of the single lens distortion region 412) may be zero or one, and the alpha value of the pixel located at the outer edge of the boundary region 502 (at the boundary of the single lens distortion region 414) may be one or zero, respectively. Such changes in the alpha value may result in the pixel located at the inner edge of the boundary region 502 being distorted based on the lens distortion corresponding to the single lens distortion region 412, the pixel located at the outer edge of the boundary region 502 being distorted based on the lens distortion corresponding to the single lens distortion region 414, and the pixels located within the inner and outer edges of the boundary region 502 being distorted based on the blend/mix of the multiple lens distortions corresponding to the single lens distortion regions 412, 414, with the blend/mix changing from one lens distortion to the other lens distortion.

As another example, in FIG. 5B, the alpha value of the pixel located at the top edge of the boundary region 504 (at the boundary of the single lens distortion region 432) may be zero or one, and the alpha value of the pixel located at the bottom edge of the boundary region 504 (at the boundary of the single lens distortion region 434) may be one or zero, respectively. Such changes in the alpha value may result in the pixel located at the top edge of the boundary region 504 being distorted based on the lens distortion corresponding to the single lens distortion region 432, the pixel located at the bottom edge of the boundary region 504 being distorted based on the lens distortion corresponding to the single lens distortion region 434, and the pixels located within the top and bottom edges of the boundary region 504 being distorted based on the blend/mix of the multiple lens distortions corresponding to the single lens distortion regions 432, 434, with the blend/mix changing from one lens distortion to the other lens distortion.

Figure 6A:
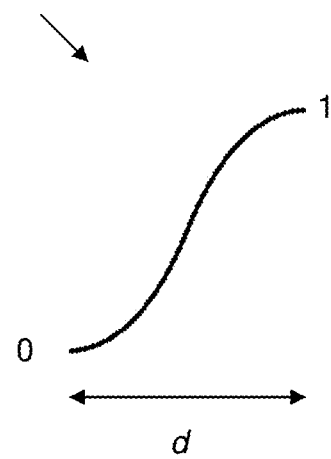
FIGS. 6A and 6B illustrate example alpha value curves for alpha transitions.
Figure 6B:
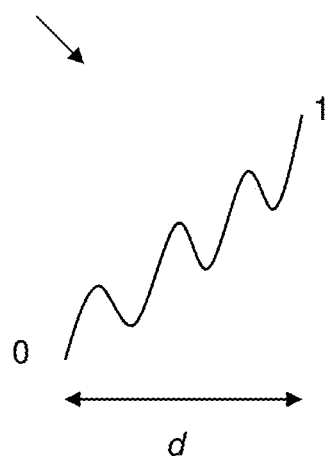

In some implementation, the changes in the alpha value within the boundary region may include non-linear changes. Non-linear changes of the alpha value may result in more natural looking blending of the multiple lens distortions than linear changes of the alpha value. For example, FIGS. 6A and 6B illustrate example alpha value curves 600, 650 for alpha transitions. The curves 600, 650 may turn input positions of the pixels within a boundary region (image/screen position) into a value between zero and one.

In FIG. 6A, the alpha value may change as a function of the input position of the pixel within a boundary region, with the alpha value being defined by the curve 600. The curve 600 may include a sinusoidal curve (e.g., rising portion of a sine curve) with the alpha value changing at a slower rate for the input positions of the pixel near an edge of the boundary region versus and changing at a faster rate for the input positions of the pixels in the middle of the boundary region. In FIG. 6B, the alpha value may change as a function of the input position of the pixel within a boundary region, with the alpha value being defined by the curve 650. The curve 600 may include a sinusoidal curve that includes multiple local maximums and minimums and cause ripple effect within the resulting distortion. Other curves defining alpha values are contemplated.

Figure 7A:
FIG. 7A illustrates an example view of an image with a single lens distortion simulation.

FIG. 7A illustrates an example view 702 of an image with a single lens distortion simulation. The image may include a spherical image. The spherical image may include spherical visual content. The view 702 may include a portion of the spherical visual content. For example, the view 702 may include a front portion of the spherical visual content within a viewing window/punchout. The view 702 may generated by using a wide-angle projection (wide-angle distortion) of the front portion of the spherical visual content on a two-dimensional plane. The wide-angle projection may cause a larger field of view (e.g., wide field of view) of the spherical visual content to be included within the view 702 than if a non-wide angle projection were used. The wide-angle projection may cause straight line in the scene to appear curved in the view 702, with curvature becoming greater towards the edges of the view 702.

Figure 7B:
FIGS. 7B, 7C, 7D, and 7E illustrate example views of images with multiple lens distortions simulation.

FIGS. 7B, 7C, 7D, and 7E illustrate example views 704, 706, 708, 710 of spherical images with multiple lens distortions simulation. In FIG. 7B, the view 704 may be generated using two lens distortions that are vertically placed within the view 704. The lower portion of the view 704 including the depiction of the center vehicle may be generated using a wide-field of view distortion to maintain the view of the center vehicle seen in the view 702. The arrangement (e.g., shifting/displacement) of pixels within the lower portion may be determined based on the wide-field of view distortion. The upper portion of the view 704 may be generated using a rectilinear distortion such that straight line appears straight in the upper portion of the view 704. The arrangement (e.g., shifting/displacement) of pixels within the upper portion may be determined based on the rectilinear distortion. The middle portion of the view 704 may be generated using a blend of the wide-field of view distortion and the rectilinear distortion. The arrangement (e.g., shifting/displacement) of pixels within the middle portion may be determined based on a blend of the wide-field of view distortion and the rectilinear distortion.

Figure 7C:

In FIG. 7C, the view 706 may be generated using two lens distortions that are laterally placed within the view 706, the with two lens distortions causing different amount of curvature. The view 706 may include a punchout of the spherical image that is rotated by 45 degrees. The lower-left portion of the view 706 may be generated using a lens distortion that causes curvature while the upper right portion of the view may be generated using a lens distortion that does not cause curvature. The interface between the lower-left portion and the upper-right portion of the view 706 may be generated based on a blend of the curvature lens distortion and non-curvature lens distortion.

Figure 7D:

In FIG. 7D, the view 708 may be generated using two lens distortions that are vertically placed within the view 708, with the two lens distortion causing different amount of zoom. The lower portion of the view 708 may be generated using a lens distortion that causes zooming while the upper portion of the view may be generated based on a lens distortion that does not cause zooming. The interface between the lower portion and the upper portion of the view may be generated based on a blend of the zoom lens distortion and non-zoom lens distortion.

Figure 7E:

In FIG. 7E, the view 710 may be generated using two lens distortions that are vertically placed within the view 710. The view 706 may include the entire spherical image. The upper portion of the view 710 may be generated using a rectilinear distortion such that straight line appears straight in the upper portion of the view 710. The lower portion of the view 710 may be generated using a stereographic distortion (e.g., little planet distortion) to include the rest of the spherical image within the lower portion. The rest of the spherical image may be wrapped around a point in the lower portion of the view 710 to generate a little planet view. The lower portion of the view 710 may include depictions of the center vehicle, the sky, and vehicles following the center vehicle. The interface between the lower portion and the upper portion of the view may be generated based on a blend of the rectilinear lens distortion and stereographic lens distortion.

Figure 8:
FIG. 8 illustrates an example view of an image with multiple lens distortions simulation.

FIG. 8 illustrates an example view 800 of an image with multiple lens distortions simulation. The image may include a wide-angle image that was captured from top of the skier's head depicted in the center of the view 800. In FIG. 8, the view 800 may be generated using two lens distortions that are vertically placed within the view 800. The upper portion of the view 800 including the depiction of the mountain range may be generated using a rectilinear distortion such that straight line appears straight in the upper portion of the view 800 (limit warping/minimization of the mountain range). The arrangement (e.g., shifting/displacement) of pixels within the upper portion may be determined based on the rectilinear distortion. The lower portion of the view 800 including the depiction of the skier may be generated using a stereographic distortion to provide a wide view of the skier. The arrangement (e.g., shifting/displacement) of pixels within the lower portion may be determined based on the stereographic distortion. The middle portion of the view 800 (including or below the horizon) may be generated using a blend of the rectilinear distortion and the stereographic distortion. For example, the horizon in the image may be used as a dividing line or used to determine the location of the dividing line for performing blending between the rectilinear distortion and the stereographic distortion. The arrangement (e.g., shifting/displacement) of pixels within the middle portion may be determined based on a blend of the rectilinear distortion and the stereographic distortion.

Figure 9A:
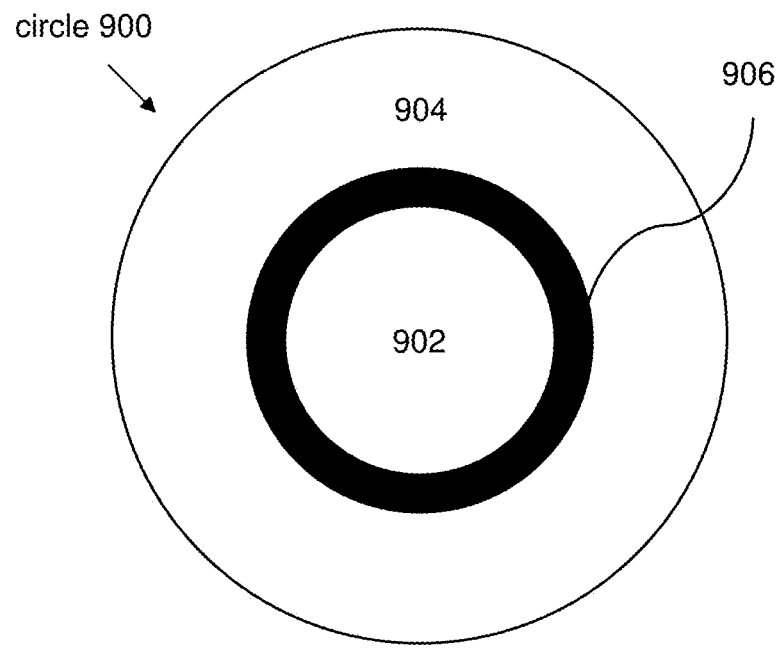
FIG. 9A illustrates an example arrangement of single lens distortion regions and a boundary region.

FIG. 9A illustrates an example arrangement of single lens distortion regions 902, 904 and a boundary region 906. The inner single lens distortion region 902 may correspond to a single lens distortion centered in a circle 900. The circle 900 may correspond to an image circle of an image sensor. The outer single lens distortion region 904 may correspond to another single lens distortion centered in the circle 900. The size of the single lens distortion corresponding to the single lens distortion region 904 may be larger than the size of the single lens distortion corresponding to the single lens distortion region 902. The boundary region 906 may be located between the single lens distortion regions 902, 904. The boundary region 906 may be determined at the boundary and/or the interface between the single lens distortion regions 902, 904. The boundary region 906 may be determined at the region of the circle 900 where the single lens distortion regions 902, 904 overlap (begins to overlap). The boundary region 906 may have a circular shape.

Figure 9B:
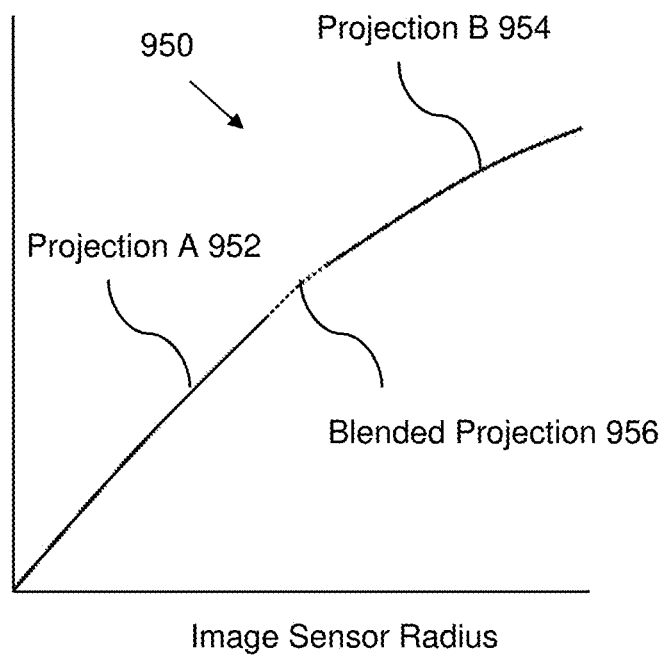
FIG. 9B illustrates example projections simulated using multiple lens distortions shown in FIG. 9A.

FIG. 9B illustrates example projections simulated using multiple lens distortions shown in FIG. 9A. The projections corresponding to different regions 902, 904, 906 may be merged into a mixed projection 950, with the projection being used determined based on location along an image sensor radius. The mixed projection may utilize a projection A 952 (corresponding to the projection of the inner single lens distortion region 902) for inner portion of the image circle and a projection B 954 (corresponding to the projection of the outer single lens distortion region 904) for the outer portion of the image circle. The projection A 952 and the projection B 954 may not meet or may meet at a sharp angle. Transitioning between the projection A 952 and the projection B 954 may cause noticeable distortion and/or discontinuities within the image.

A blended projection 956 (corresponding to the projection of the boundary region 906) may be generated as a blend of the projection A 952 and the projection B 954. The blended projection 956 may change from the projection A 952 to the projection B 954 as a function of the image sensor radius to smoothly connect/join the projection A 952 to the projection B 954 into a single curvature. Use of the blended projection 956 may facilitate continuous distortion of pixels within the image such that different lens distortions simulated within the image circle smoothly changes into other lens distortions. For example, the projection A 952 may include a rectilinear projection and the projection B 954 may include a stereographic projection. As field of view becomes larger, the projection may change from rectilinear projection to stereographic projection through the blended projection 956. Use of such combinations of projection may facilitate a virtual lens with a single curvature that provides a rectilinear view when zoomed in and provides a stereographic view when zoomed out. Other combinations of projections are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
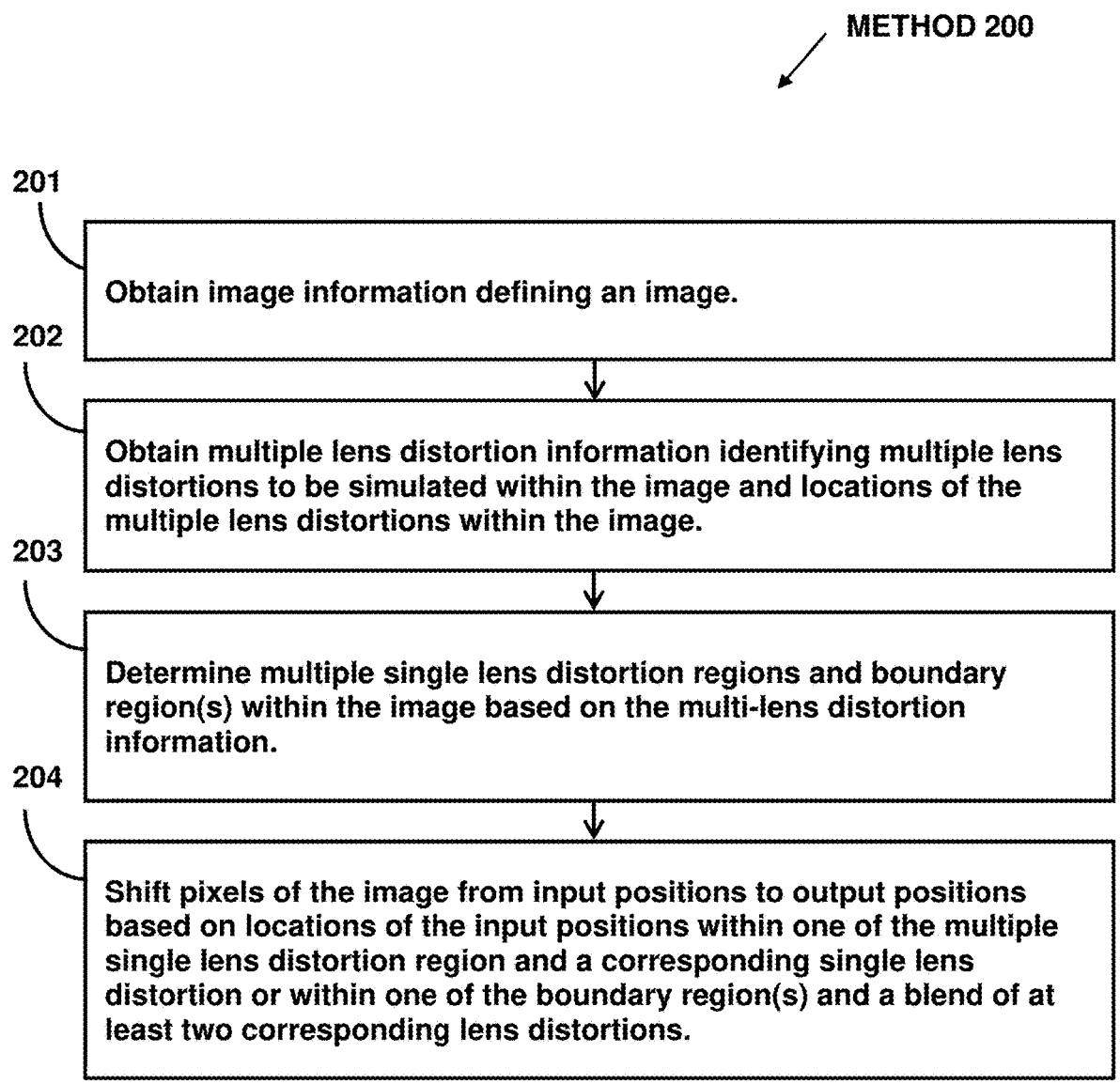
FIG. 2 illustrates an example method for simulating multiple lens distortions within images.

FIG. 2 illustrates method 200 for simulating multiple lens distortions within images. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, image information may be obtained. The image information may define an image including visual content. The visual content of the image may be defined by pixels located at input positions and/or other information. In some implementation, operation 201 may be performed by a processor component the same as or similar to the image information component 102 (Shown in FIG. 1 and described herein).

At operation 202, multi-lens distortion information may be obtained. The multi-lens distortion information may identify multiple lens distortions to be simulated within the image and locations of the multiple lens distortions within the image. The multiple lens distortions may include a first lens distortion positioned at a first lens distortion location within the image(s), a second lens distortion positioned at a second lens distortion location within the image(s), and/or other lens distortions positions at other distortion locations within the image. In some implementation, operation 202 may be performed by a processor component the same as or similar to the multi-lens distortion information component 104 (Shown in FIG. 1 and described herein).

At operation 203, multiple single lens distortion regions and one or more boundary regions within the image may be determined based on the multi-lens distortion information and/or other information. Individual single lens distortion regions may have pixel displacement defined by a single lens distortion and/or other information. Individual boundary regions may have pixel displacement defined by a blend of at least two lens distortions and/or other information. The multiple single lens distortion regions may include a first lens distortion region having pixel displacement defined by the first lens distortion and a second lens distortion region having pixel displacement defined by the second lens distortion. The boundary region(s) may include a boundary region having pixel displacement defined by a blend of the first lens distortion and the second lens distortion. The boundary region may be located between the first lens distortion region and the second lens distortion region. In some implementation, operation 203 may be performed by a processor component the same as or similar to the region component 106 (Shown in FIG. 1 and described herein).

At operation 204, the pixels of the image may be shifted from the input positions to output positions based on locations of the input positions of the pixels within one of the multiple single lens distortion region and a corresponding single lens distortion or within one of the boundary region(s) and a blend of at least two corresponding lens distortions. In some implementation, operation 204 may be performed by a processor component the same as or similar to the distort component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for simulating lens distortions within a single image, the system comprising:
    one or more physical processors configured by machine-readable instructions to:
        obtain image information, the image information defining an image including visual content, the visual content defined by pixels located at input positions;
        obtain multi-lens distortion information, the multi-lens distortion information identifying multiple lens distortions to be simulated within the image and locations of the multiple lens distortions within the image, wherein the multiple lens distortions includes a first lens distortion positioned at a first lens distortion location within the image and a second lens distortion positioned at a second lens distortion location within the image;
        determine multiple single lens distortion regions and one or more boundary regions within the image based on the multi-lens distortion information, individual single lens distortion regions having pixel displacement defined by a single lens distortion and individual boundary regions having pixel displacement defined by a blend of at least two lens distortions such that the multiple single lens distortion regions include a first lens distortion region having pixel displacement defined by the first lens distortion and a second lens distortion region having pixel displacement defined by the second lens distortion, and the one or more boundary regions includes a first boundary region having pixel displacement defined by a blend of the first lens distortion and the second lens distortion, the first boundary region located between the first lens distortion region and the second lens distortion region; and
        shift the pixels of the image from the input positions to output positions based on locations of the input positions within one of the multiple single lens distortion region and a corresponding single lens distortion or within one of the one or more boundary regions and a blend of at least two corresponding lens distortions.

2. The system of claim 1, wherein the blend of the first lens distortion and the second lens distortion is determined based on an alpha transition between first lens geometric properties of the first lens distortion and second lens geometric properties of the second lens distortion.

3. The system of claim 2, wherein an alpha value of the alpha transition for a pixel is determined based on a corresponding input position within the first boundary region.

4. The system of claim 1, wherein the first lens distortion and the second lens distortion are adjacently positioned within the image such that the first lens distortion location is next to the second lens distortion location.

5. The system of claim 1, wherein the first lens distortion is positioned within the second lens distortion such that the first lens distortion location is within the second lens distortion location.

6. The system of claim 1, wherein the first lens distortion or the second lens distortion uses multiple lens projections.

7. The system of claim 6, wherein the multiple lens projections used by the first lens distortion or the second lens distortion include both rectilinear projection and stereographic projection.

8. The system of claim 1, wherein the locations of the multiple lens distortions within the image are defined by values of a pan parameter, a tilt parameter, a rotate parameter, and a size parameter.

9. The system of claim 1, wherein the locations of the multiple lens distortions within the image are determined based on visual content detection.

10. The system of claim 9, wherein:
the first lens distortion uses a rectilinear projection;
the second lens distortion uses a stereographic projection;
the visual content detection includes horizon detection; and
the locations of the multiple lens distortions within the image are determined based on the horizon detection such that the first lens distortion location is above or includes a horizon detected within the image and the second lens distortion location is below the horizon detected within the image.

11. A method for simulating lens distortions within a single image, the method performed by a computing system including one or more physical processors, the method comprising:
obtaining, by the computing system, image information, the image information defining an image including visual content, the visual content defined by pixels located at input positions;
obtaining, by the computing system, multi-lens distortion information, the multi-lens distortion information identifying multiple lens distortions to be simulated within the image and locations of the multiple lens distortions within the image, wherein the multiple lens distortions includes a first lens distortion positioned at a first lens distortion location within the image and a second lens distortion positioned at a second lens distortion location within the image;
determining, by the computing system, multiple single lens distortion regions and one or more boundary regions within the image based on the multi-lens distortion information, individual single lens distortion regions having pixel displacement defined by a single lens distortion and individual boundary regions having pixel displacement defined by a blend of at least two lens distortions such that the multiple single lens distortion regions include a first lens distortion region having pixel displacement defined by the first lens distortion and a second lens distortion region having pixel displacement defined by the second lens distortion, and the one or more boundary regions includes a first boundary region having pixel displacement defined by a blend of the first lens distortion and the second lens distortion, the first boundary region located between the first lens distortion region and the second lens distortion region; and shifting, by the computing system, the pixels of the image from the input positions to output positions based on locations of the input positions within one of the multiple single lens distortion region and a corresponding single lens distortion or within one of the one or more boundary regions and a blend of at least two corresponding lens distortions.

12. The method of claim 11, wherein the blend of the first lens distortion and the second lens distortion is determined based on an alpha transition between first lens geometric properties of the first lens distortion and second lens geometric properties of the second lens distortion.

13. The method of claim 12, wherein an alpha value of the alpha transition for a pixel is determined based on a corresponding input position within the first boundary region.

14. The method of claim 11, wherein the first lens distortion and the second lens distortion are adjacently positioned within the image such that the first lens distortion location is next to the second lens distortion location.

15. The method of claim 11, wherein the first lens distortion is positioned within the second lens distortion such that the first lens distortion location is within the second lens distortion location.

16. The method of claim 11, wherein the first lens distortion or the second lens distortion uses multiple lens projections.

17. The method of claim 16, wherein the multiple lens projections used by the first lens distortion or the second lens distortion include both rectilinear projection and stereographic projection.

18. The method of claim 11, wherein the locations of the multiple lens distortions within the image are defined by values of a pan parameter, a tilt parameter, a rotate parameter, and a size parameter.

19. The method of claim 11, wherein the locations of the multiple lens distortions within the image are determined based on visual content detection.

20. The method of claim 19, wherein:
the first lens distortion uses a rectilinear projection;
the second lens distortion uses a stereographic projection;
the visual content detection includes horizon detection; and
the locations of the multiple lens distortions within the image are determined based on the horizon detection such that the first lens distortion location is above or includes a horizon detected within the image and the second lens distortion location is below the horizon detected within the image.

* * * * *